(12) United States Patent
Sung

(10) Patent No.: US 6,793,248 B1
(45) Date of Patent: Sep. 21, 2004

(54) ADJUSTABLE CHASSIS OF AN ELECTRIC CART

(75) Inventor: Chung-Che Sung, Taichung (TW)

(73) Assignee: Genemax Medical Products Industry Corp., Taichung (TW)

( * ) Notice: Subject to any disclaimer, the term of this patent is extended or adjusted under 35 U.S.C. 154(b) by 40 days.

(21) Appl. No.: 10/327,395

(22) Filed: Dec. 24, 2002

(51) Int. Cl.⁷ ............................................. B62D 24/00
(52) U.S. Cl. ...................... 280/781; 280/638; 180/208; 180/209; 180/311
(58) Field of Search ................................ 280/781, 785, 280/797, 798, 638, 149.2; 180/208, 209, 311; 296/205

(56) References Cited

U.S. PATENT DOCUMENTS

| | | | | | |
|---|---|---|---|---|---|
| 3,249,171 | A | * | 5/1966 | Kinghorn | 180/208 |
| 4,232,755 | A | * | 11/1980 | Dow | 180/65.6 |
| 4,471,972 | A | * | 9/1984 | Young | 280/304.1 |
| 4,639,015 | A | * | 1/1987 | Pitts | 280/789 |
| 4,813,693 | A | * | 3/1989 | Lockard et al. | 280/42 |
| 5,040,825 | A | * | 8/1991 | Kuhns | 280/789 |
| 5,042,831 | A | * | 8/1991 | Kuhns | 280/656 |
| 5,074,574 | A | * | 12/1991 | Carwin | 280/304.1 |
| 5,826,670 | A | * | 10/1998 | Nan | 180/15 |
| 6,273,206 | B1 | * | 8/2001 | Bussinger | 180/208 |
| 6,283,238 | B1 | * | 9/2001 | Royer et al. | 180/19.1 |
| 6,530,445 | B1 | * | 3/2003 | Flowers et al. | 180/208 |
| 6,554,086 | B1 | * | 4/2003 | Goertzen et al. | 180/65.1 |

* cited by examiner

Primary Examiner—Paul N. Dickson
Assistant Examiner—Toan To
(74) Attorney, Agent, or Firm—Harrison & Egbert

(57) ABSTRACT

An electric cart chassis includes a front unit and a rear unit. The front unit is fastened to a front wheel assembly and is formed of at least two support rods and a locating rod. The rear unit is fastened to a rear wheel assembly and is formed of at least two sleeves and a locating sleeve. The front unit is adjustably fastened to the rear unit such that the two support rods are adjustably fastened to the two sleeves, and such that the locating rod is adjustably fastened to the locating sleeve in conjunction with a locating bolt which is put through a locating hole of the locating sleeve and one of a series of locating holes of the locating rod.

1 Claim, 5 Drawing Sheets

ADJUSTABLE CHASSIS OF AN ELECTRIC CART

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an electric cart, and more particularly to an adjustable chassis of the electric cart.

BACKGROUND OF THE INVENTION

The conventional electric cart comprises a chassis, a front wheel assembly fastened to a front end of the chassis, and a rear wheel assembly fastened to a rear end of the chassis. The chassis cannot be adjusted in length to suit the body size of an operator of the electric cart. In light of the electric cart being widely used in the game field, the factory floor, the amusement park, and the like, the purpose of the conventional electric cart is thus limited by its fixed chassis. In another words, a number of the conventional electric carts different in chassis size must be purchased to meet the needs of operators different in body size.

BRIEF SUMMARY OF THE INVENTION

The primary objective of the present invention is to provide an electric cart comprising a chassis adjustable in length so as to enable the electric cart to accommodate operators of various body sizes.

In keeping with the principle of the present invention, the foregoing objective of the present invention is attained by an electric cart comprising a front chassis unit, a front wheel assembly fastened with a front end of the front chassis unit, a rear chassis unit, and a rear wheel assembly fastened with a rear end of the rear chassis unit. The front chassis unit is adjustably fastened at a rear end with a front end of the rear chassis unit, thereby enabling the distance between the front wheel assembly and the rear wheel assembly to be adjusted.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
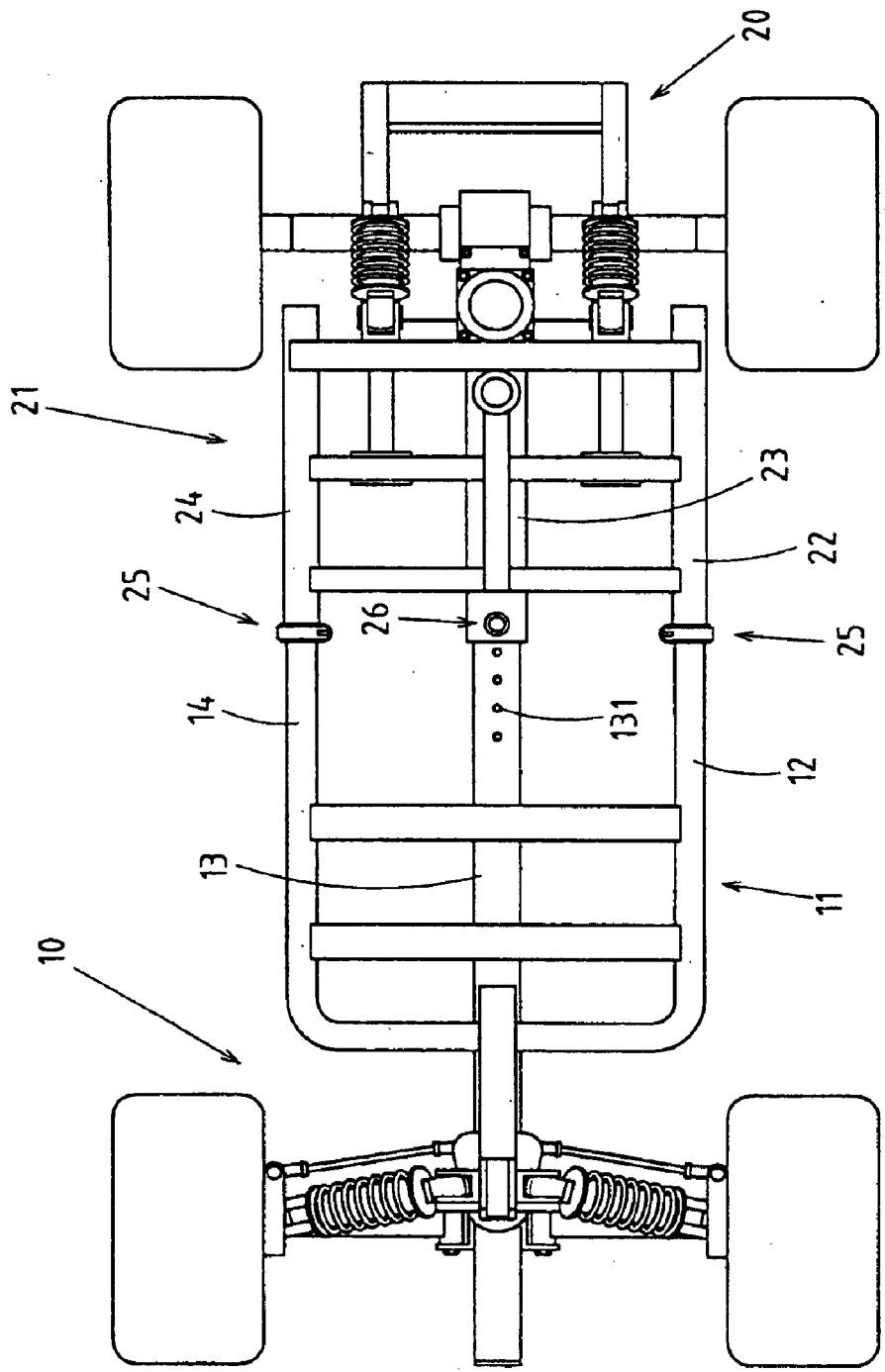
FIG. 1 shows a top plan view of the preferred embodiment of the present invention.
Figure 2:
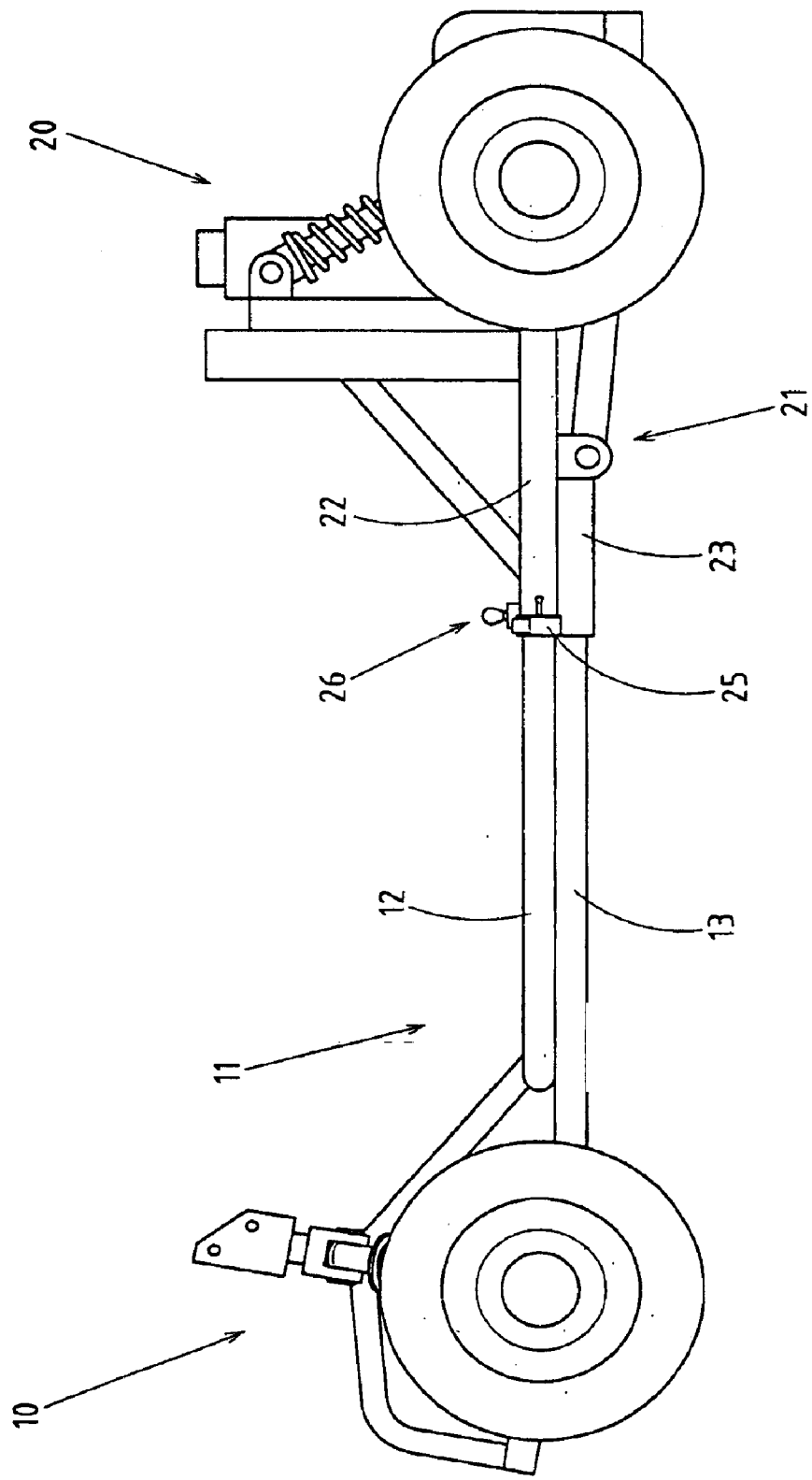
FIG. 2 shows a side schematic view of the preferred embodiment of the present invention.

As shown in FIGS. 1–5, an electric cart embodied in the present invention comprises a front wheel assembly 10, a rear wheel assembly 20, a front chassis unit 11, and a rear chassis unit 21.

The front wheel assembly 10 is fastened with a front end of the front chassis unit 11 which is formed of a first support rod 12, a second support rod 13, and a third support rod 14. The second support rod 13 is located between the first support rod 12 and the third support rod 14 such that the second support rod 13 is parallel to the first support rod 12 and the third support rod 14, and that the second support rod 13 is joined at a front end thereof with the first support rod 12 and the third support rod 14 to form the front end of the front chassis unit 11. The second support rod 13 is provided at a rear end with a series of locating holes 131.

Figure 4:
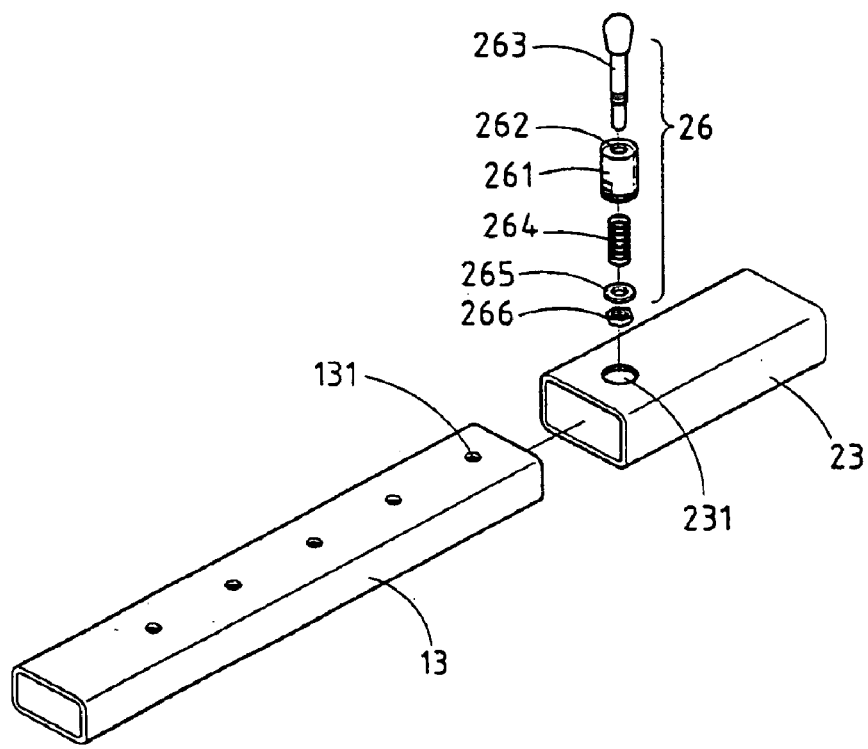
FIG. 4 shows another partial exploded perspective view of the front chassis unit and the rear chassis unit of the preferred embodiment of the present invention.

The rear wheel assembly 20 is fastened with a rear end of the rear chassis unit 21 which is formed of a first sleeve 22, a second sleeve 23, and a third sleeve 24. The second sleeve 23 is located between the first sleeve 22 and the third sleeve 24 such that a rear end of the second sleeve 23 is joined with the first sleeve 22 and the third sleeve 24 to form the rear end of the rear chassis unit 21. The first sleeve 22 is aligned with the first support rod 12, while the second sleeve 23 and the third sleeve 24 are respectively aligned with the second support rod 13 and the third support rod 14. The second sleeve 23 is provided at a front end with a locating hole 231 and a locating bolt member 269 as shown in FIG. 4.

The front chassis unit 11 is adjustably fastened with the rear chassis unit 21 in such a way that a rear end of the first support rod 12 is fitted into a front end of the first sleeve 22 in conjunction with a tightening ring 25, and that the rear end of the second support rod 13 is fitted into the front end of the second sleeve 23 in conjunction with the locating bolt member 26 which is put through the locating hole 231 of the front end of the second sleeve 23 and one of the locating holes 131 of the rear end of the second support rod 13. Meanwhile, the rear end of the third support rod 14 is fitted into the front end of the third sleeve 24 in conjunction with a tightening ring 25.

Figure 7:
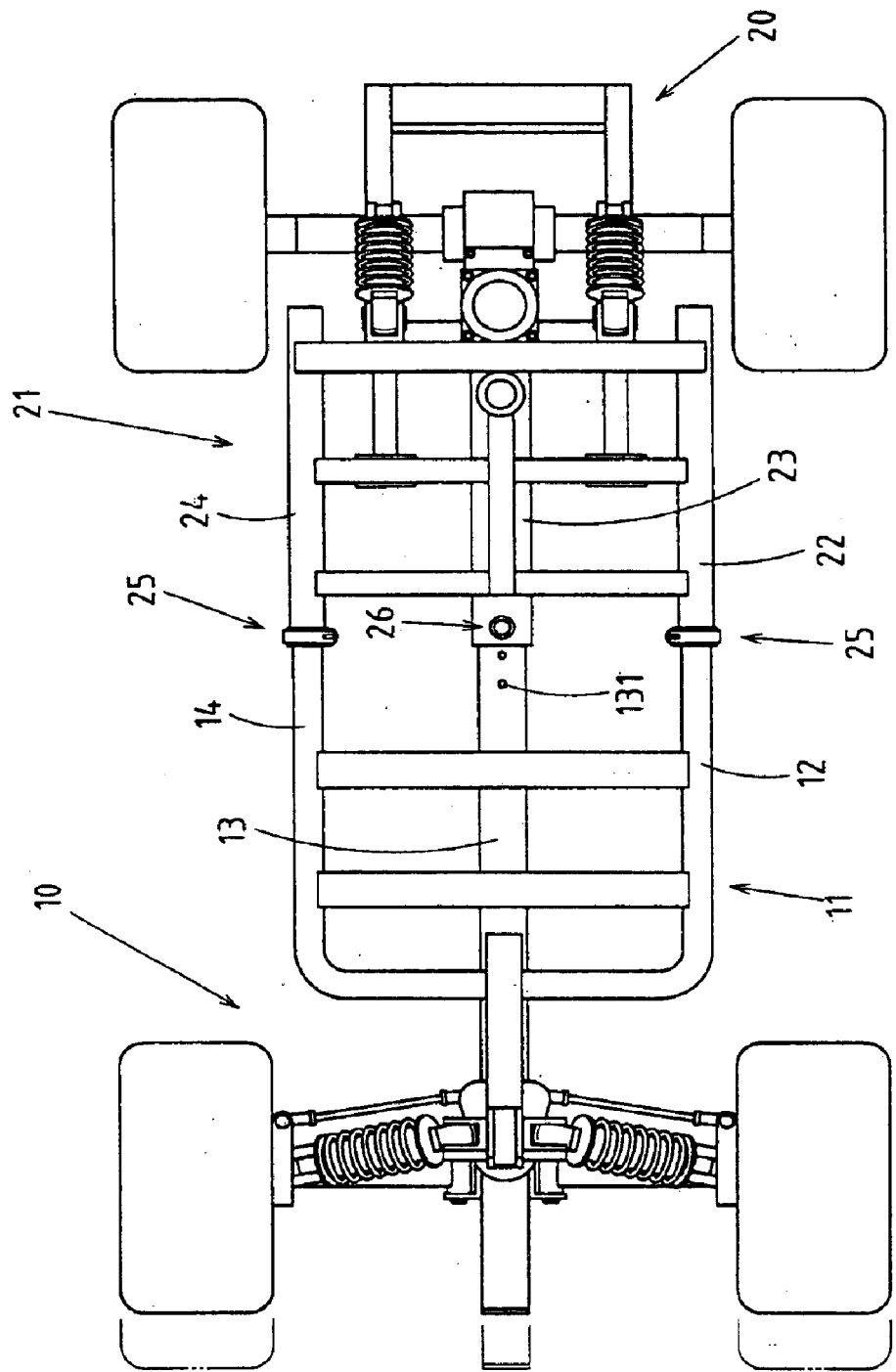
FIG. 7 shows a top plan view of the preferred embodiment of the present invention with the distance between the front wheel assembly and the rear wheel assembly thereof being shortened.

In light of a series of locating holes 131 of the second support rod 13 of the front chassis unit 11, the distance between the front wheel assembly 10 and the rear wheel assembly 20 can be adjusted to suit the body size of an operator of the electric cart, as illustrated in FIG. 7 in which the distance between the front wheel assembly 10 and the rear wheel assembly 20 is shortened.

Figure 3:
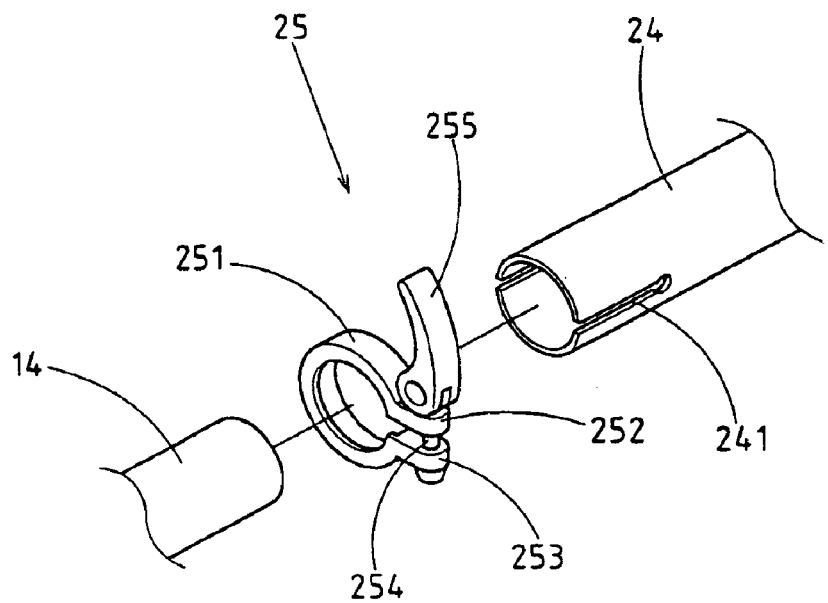
FIG. 3 shows a partial exploded perspective view of the front chassis unit and the rear chassis unit of the preferred embodiment of the present invention.

As shown in FIG. 3, the front end of the third sleeve 24 is provided with two allowance slits 241 opposite to each other. The tightening ring 25 has a C-shaped body 251 which is provided with an upper projection 252, a lower projection 253 opposite to the upper projection 252, a tightening bolt 254 fastened between the upper projection 252 and the lower projection 253, and a knob 255 by which a pressure can be exerted on the tightening ring 25 so as to fasten securely the rear end of the third support rod 14 with the front end of the third sleeve 24. The allowance slits 241 of the front end of the third sleeve 24 are intended to facilitate the fastening and the unfastening of the support rod 14 and the sleeve 24. The first support rod 12 and the first sleeve 22 are fastened and unfastened in the same way as described above.

Figure 5:
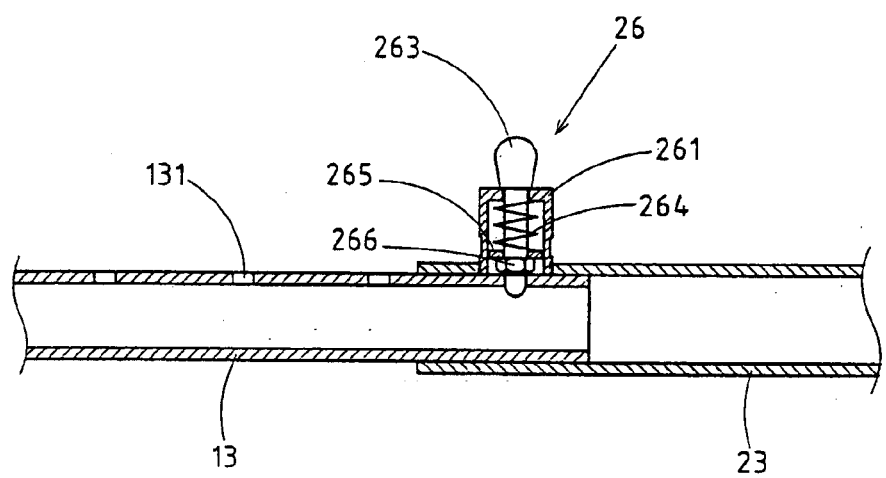
FIG. 5 shows a partial sectional schematic view of the front chassis unit and the rear chassis unit of the preferred embodiment of the present invention in combination.
Figure 6:
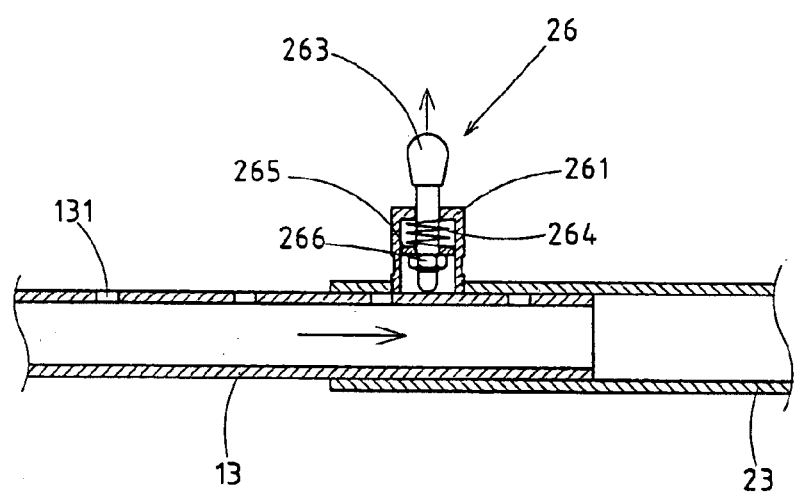
FIG. 6 shows a sectional schematic view of the working of the present invention as shown in FIG. 5.

As shown in FIGS. 4, 5, and 6, the locating pin member 26 is formed of a bolt 263, a tubular body 261 with a center through hole 262, a spring 264 disposed in the center through hole 262 of the tubular body 261, a support piece 265 for supporting the bottom end of the spring 264, and a nut 266. The bolt 263 is put into the center through hole 262 of the tubular body 261 such that the bolt 263 is fitted into the spring 264, and that the bottom end of the bolt 263 is fastened with the nut 266 via the support piece 265. The bottom end of the tubular body 261 is fastened with the locating hole 231 of the front end of the second sleeve 23. The rear end of the second support rod 13 is adjustably fastened with the front end of the second sleeve 23 such that the bottom end of the bolt 263 is inserted into one of the locating holes 131 of the second support rod 13 by virtue of the tension of the spring 264, as shown in FIG. 5.

As illustrated in FIG. 6, the bolt 263 is drawn upward as indicated by an upright arrow, thereby resulting in withdrawal of the bottom end of the bolt 263 from the locating hole 131 of the second support rod 13. As a result, the rear end of the second support rod 13 can be slid further into the second sleeve 23 as indicated by a horizontal arrow.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claims.

I claim:

1. An electric cart comprising:

a front chassis unit;

a front wheel assembly fastened to a front end of said front chassis unit;

a rear chassis unit adjustably fastened at a front end to a rear end of said front chassis unit; and a rear wheel assembly fastened to a rear end of said chassis unit;

wherein said front chassis unit is comprised of at least two support rods, and a locating rod disposed between said two support rods and comprised of, at a rear end thereof, a series of locating holes; and wherein said rear chassis unit is comprised of at least two sleeves, and a locating sleeve disposed between said two sleeves and comprised of, at a front end thereof, a locating hole whereby said rear chassis unit is adjustably fastened at the front end to the rear end of said front chassis unit in such a way that said two sleeves are adjustably fitted over said two support rods in conjunction with a tightening ring, and such that said locating sleeve is adjustably fitted over said locating rod in conjunction with a locating bolt which is put through said locating hole of said locating sleeve and one of said locating holes of said locating rod.

* * * * *